July 25, 1933.                W. J. SIX                1,920,022
BEARING MANUFACTURE
Filed Jan. 7, 1930

INVENTOR.
Walter J. Six
BY
Fay, Oberlin & Fay
ATTORNEYS.

Patented July 25, 1933

1,920,022

UNITED STATES PATENT OFFICE

WALTER J. SIX, OF INDIANAPOLIS, INDIANA, ASSIGNOR TO THE CLEVELAND GRAPHITE BRONZE COMPANY, OF CLEVELAND, OHIO, A CORPORATION OF OHIO

BEARING MANUFACTURE

Application filed January 7, 1930. Serial No. 419,055.

The present invention relating as indicated to bearing manufacture, is particularly directed to a new and improved method of bonding a metal such as brass, bronze, or the like, to the inside of a cylindrical shell of some stronger metal of higher melting point such as steel, for the purpose of making a lined cylindrical bearing, or for the purpose of coating steel pipes or similar articles. To the accomplishment of the foregoing and related ends, said invention, then, consists of the means and steps hereinafter fully described and particularly pointed out in the claim.

The annexed drawing and the following description set forth in detail certain means and one mode of carrying out the invention, such disclosed means and mode illustrating, however, but one of various ways in which the principle of the invention may be used.

Figure 1:
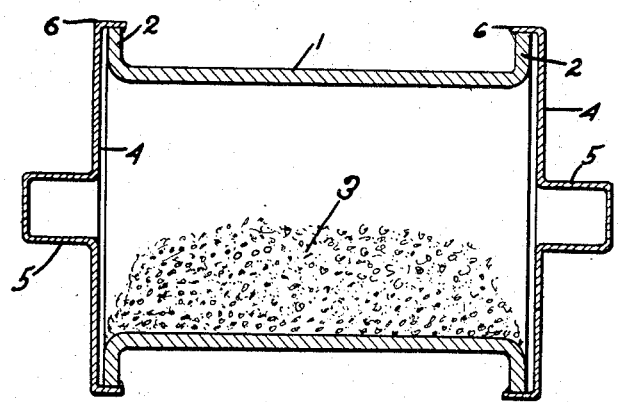
Figure 2:
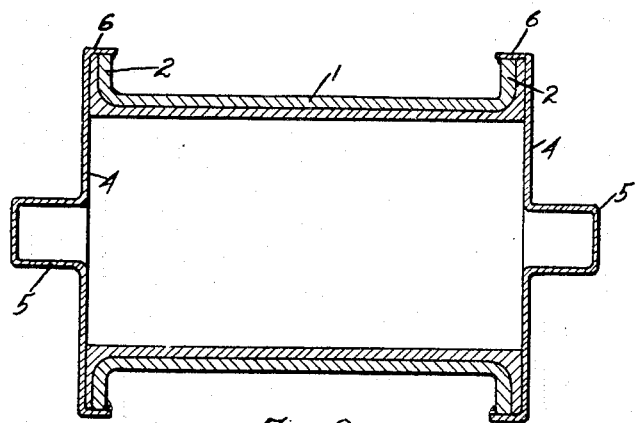
Figure 3:
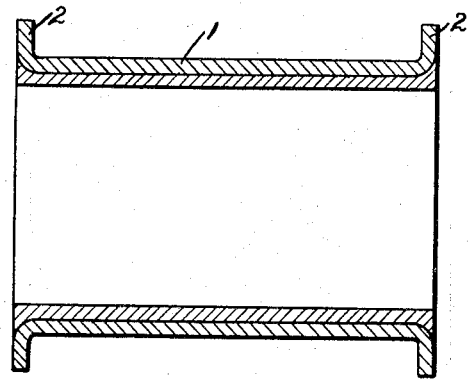

In said annexed drawing:

Fig. 1 is a central vertical section illustrating a cylindrical shell in process of being lined by my improved method; Fig. 2 is a similar view showing the shell after the bonding thereto of the lining; and Fig. 3 is a similar view of a finished shell.

In the manufacture of bearings, it is highly desirable, if possible, to apply a relatively thin coating of some suitable bearing metal such, for example, as brass or bronze, to a shell of a stronger material such as steel, which will be less expensive than the bronze and which will be better adapted to support the facing or lining of the bearing metal. Various methods have been suggested for integrally uniting such metals as brass and steel for this purpose, but I have devised a new, simple, and inexpensive method for uniformly bonding brass to the inside of steel shells. It will be understood that the term "brass" as used in this description includes any metal adapted for bearing purposes and having a lower melting point than the metal employed for the outside retaining shell or backing. Similarly the term "steel" as used herein includes any metal having a higher melting point than the brass lining and having the desired characteristics of strength, toughness and rigidity which are required in the outer supporting shell.

Briefly stated, my improved method consists in providing a hollow steel shell of cylindrical form, filling the same with a predetermined amount of comminuted brass mixed with a similar amount of flux, if desired, sealing the ends of the shell, and then rotating the same about its central longitudinal axis while raising the temperature of the shell and contents to a point sufficient to melt the brass and cause it to flow around the interior of the shell. The shell and molten brass are then maintained in rotation while the brass is allowed to cool and to bond during the cooling uniformly over the interior surface of the shell after which the shell is cooled. The sealing elements are removed from the ends and the lined shell is machined or finished to the desired inside and outside dimensions.

Referring now to the drawing, I have shown in Fig. 1 a steel shell 1 provided with flanges 2 and containing a quantity 3 of comminuted brass mixed with a suitable flux. The shell when so filled is sealed by means of steel end plates 4 which are provided with axial projections 5 permitting the two end plates to be gripped in suitable chucks in a machine for rotating the shell during the melting of the comminuted metal. These steel end plates 4 may be secured to the flanges 2 of the shell in any suitable manner provided that a perfectly tight joint is secured and for this purpose I prefer to fit the flanges 6 on the caps 4 snugly over the edges of the flanges 2 on the shell and then weld the contacting flanges together. A small vent may be provided in one or the other of the caps to permit the escape of vapor and heated air during the melting operation.

The sealed shell and contents is then placed in a suitable machine, rotated about its longitudinal central axis passing through the center of the projections 5 on the caps while heating is applied to the entire shell sufficient to melt the comminuted metal 3 and cause the same to flow evenly and completely over the interior of the shell. The rotation is continued during the cooling of the metal and until the metal has bonded uniformly all over the the interior of the shell as shown in Fig. 2.

The shell is then removed from the machine, the end caps 4 are removed from the flanges of the shell in any suitable manner, and the excess brass is removed from the end flanges 2 of the shell after which the shell may be finished inside and outside to the desired predetermined dimension.

My improved method provides a simple and safe process for centrifugally lining steel shells with brass producing a brass lined steel shell in which the greater part of the article is of relatively cheap steel, but having a relatively thin and hence inexpensive lining of a desired bearing metal such as brass. The application of the brass by centrifugal casting secures a dense homogeneous metal in the lining and but a slight amount of brass is lost through the removal of some part of the material which adheres to the outer sides of the flanges 2.

Other forms may be employed embodying the features of my invention instead of the one here explained, change being made in the form or construction, provided the elements stated by the following claim or the equivalent of such stated elements be employed, whether produced by my preferred method or by others embodying steps equivalent to those stated in the following claim.

I therefore particularly point out and distinctly claim as my invention:

In a method of making bearings, the steps which consist in providing a cylindrical flanged steel shell, introducing thereinto a predetermined quantity of comminuted brass, sealing the flanges of said shell at the radially outward edges thereof, rotating said shell and applying heat thereto to melt such comminuted metal and cause the same to flow uniformly about the interior of the shell and exterior of said flanges to form a lining thereon, cooling said lining and finally removing said lining from said flanges.

WALTER J. SIX.